United States Patent
Bagley et al.

[15] 3,656,853
[45] *Apr. 18, 1972

[54] INTERFEROMETRIC SYSTEM

[72] Inventors: Alan S. Bagley, Los Altos Hills, Calif.; Leonard S. Cutler, Topsfield, Mass.; Joseph F. Rando, Oakland, Calif.

[73] Assignee: Hewlett-Packard Company, Palo Alto, Calif.

[ * ] Notice: The portion of the term of this patent subsequent to July 29, 1986, has been disclaimed.

[22] Filed: Mar. 10, 1969

[21] Appl. No.: 805,662

Related U.S. Application Data

[62] Division of Ser. No. 592,589, Nov. 7, 1966, Pat. No. 3,458,259.

[52] U.S. Cl. ............................................................356/106
[51] Int. Cl. ............................................................G01b 9/02
[58] Field of Search ...................................356/106–113, 4; 343/7.7, 8; 331/94.5

[56] References Cited

UNITED STATES PATENTS

| | | | |
|---|---|---|---|
| 3,583,573 | 1/1952 | Jaynes | 343/8 |
| 3,249,936 | 5/1966 | Forestier | 343/8 |
| 3,409,369 | 11/1968 | Bickel | 356/107 |
| 3,409,375 | 11/1968 | Hubbard | 356/106 |
| 3,453,557 | 7/1969 | Polanyi et al. | 331/94.5 |
| 3,458,259 | 7/1969 | Bagley et al. | 356/106 |
| 3,463,924 | 8/1969 | Culshaw et al. | 250/199 |

Primary Examiner—Ronald L. Wibert
Assistant Examiner—Conrad Clark
Attorney—Roland I. Griffin

[57] ABSTRACT

A portion of a first laser light beam of one optical frequency and a portion of a second laser light beam of a different optical frequency are mixed by a photoelectric device to produce an electrical reference signal having a countable intermediate frequency. Another portion of the first laser light beam traverses a fixed length optical path of an interferometer, and another portion of the second laser light beam traverses a variable length optical path of the interferometer. These other portions of the first and second laser light beams are mixed by another photoelectric device to produce an electrical information signal having the same countable intermediate frequency as the reference signal only while the optical length of the variable length optical path is not being changed. A reversible counter integrates the difference in frequency between the reference and information signals while the optical length of the variable length optical path is being changed to indicate the change in length of the variable length optical path.

1 Claim, 2 Drawing Figures

INVENTORS
ALAN S. BAGLEY
LEONARD S. CUTLER
JOSEPH F. RANDO
BY Roland I. Griffin
ATTORNEY INVENTORS
ALAN S. BAGLEY
LEONARD S. CUTLER
JOSEPH F. RANDO
BY Roland I. Griffin
ATTORNEY

INTERFEROMETRIC SYSTEM

CROSS-REFERENCE TO RELATED APPLICATION

This is a divisional application of U.S. patent application Ser. No. 592,589 entitled INTERFEROMETRIC SYSTEM filed Nov. 7, 1966, by Alan S. Bagley, Leonard S. Cutler, and Joseph F. Rando, and issued July 29, 1969, as U.S. Pat. No. 3,458,259.

This invention relates to an interferometric system that uses two optical frequencies for measuring length. Such a two frequency interferometric system is an a-c system that operates at the frequency difference between the two optical frequencies.

Conventional interferometric systems typically use only one optical frequency for measuring length and are therefore d-c systems. The resolution and the reliability of a d-c system may be seriously impaired by $1/f$ noise and by d-c shifts as well as by temperature gradients, air turbulence, and other such causes of instability. In an a-c system $1/f$ noise and d-c shifts are completely avoided, and the above-mentioned causes of instability are substantially less consequential since such techniques as automatic gain control may be employed to compensate for these causes of instability.

Accordingly, it is an object of this invention to provide a two frequency interferometric system for measuring length.

It is another object of this invention to provide a two frequency interferometric system for continuously measuring the change in optical length of a variable length optical path of the system.

Another object of this invention is to increase the resolution of a two frequency interferometric system for measuring length.

Still another object of this invention is to provide a two frequency interferometric system in which the wavelength unit of measured length may be simply converted to a conventional unit of measured length, such as the centimeter, by frequency synthesis.

These objects are accomplished according to the illustrated embodiments of this invention by providing a photoelectric device for mixing a portion of a first laser light beam having one optical frequency with a portion of a second laser light beam having a different optical frequency so as to produce an electrical reference signal having a countable intermediate or difference frequency. An interferometer is provided having a fixed length optical path traversed by another portion of the first laser light beam and a variable length optical path traversed by another portion of the second laser light beam. After these other portions of the first and second laser light beams have traversed these optical paths of the interferometer, they are mixed by another photoelectric device so as to produce an electrical comparison signal having the same countable intermediate frequency as the reference signal so long as the optical length of the variable length optical path is not being changed. A reversible counter integrates the difference in frequency between these reference and comparison signals while the optical length of the variable length optical path is being changed so as to indicate the difference in phase between these signals and hence the change in length of the variable length optical path in units of the wavelength of light. The resolution of this interferometric system for measuring length may be substantially increased and the wavelength unit of measured length, converted to a conventional unit of measured length, such as the centimeter, by multiplying each of the reference and comparison signal frequencies by a selected number.

Other and incidental objects of this invention will be apparent from a reading of this specification and an inspection of the accompanying drawing in which.

Figure 1:
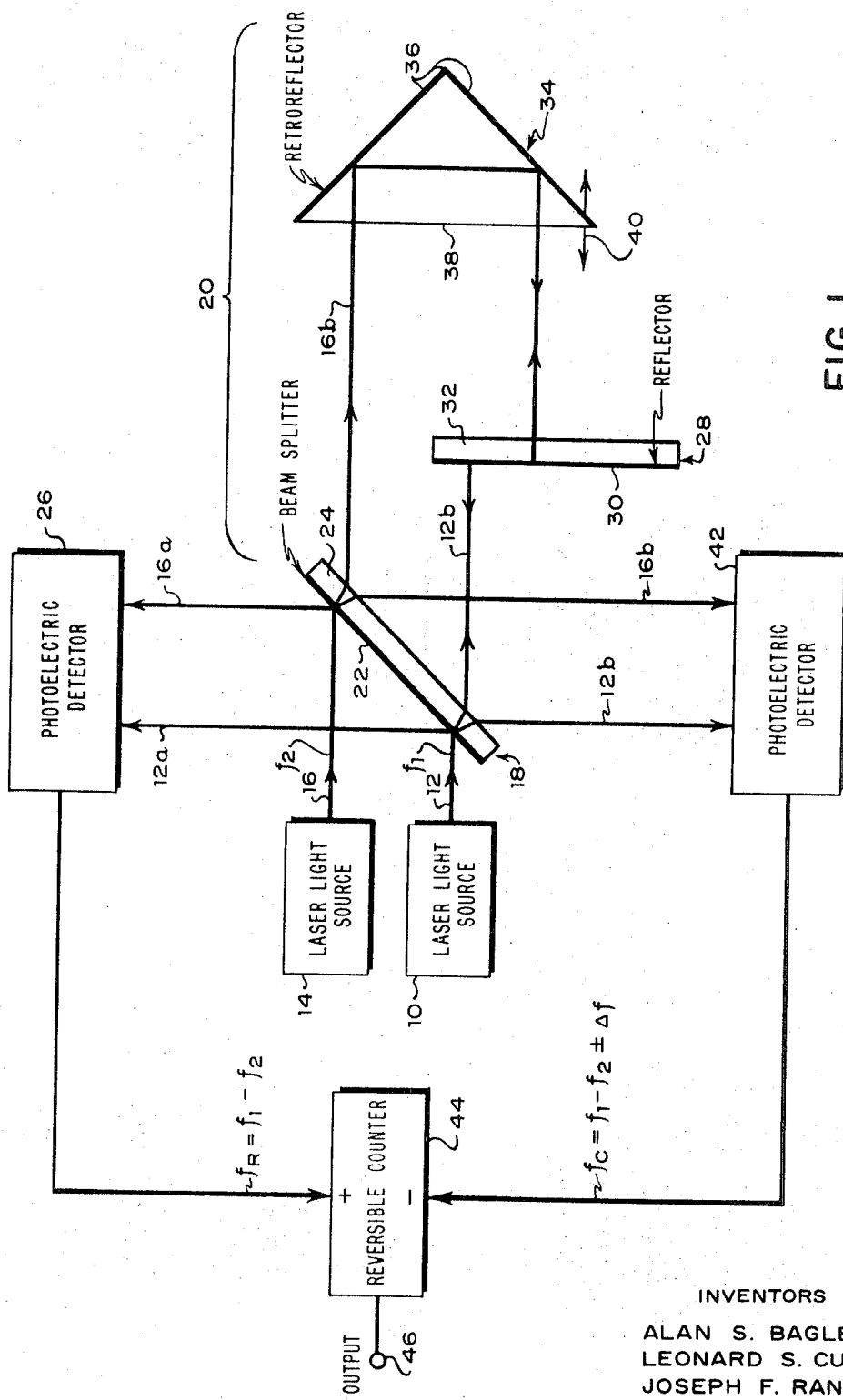
FIG. 1 is a schematic representation of one embodiment of this invention.

Referring to FIG. 1, there is shown an interferometric system comprising a laser light source 10 for emitting a beam of light 12 having an optical frequency $f_1$ and another laser light source 14 for emitting a substantially parallel beam of light 16 having an optical frequency $f_2$ that differs from the optical frequency $f_1$ by a countable intermediate frequency, such as 500 kilohertz. A beam splitter 18 of an interferometer 20 is mounted in the optical path traversed by these parallel beams of light 12 and 16 for reflecting parallel portions 12a and 16a of the light beams 12 and 16 and for transmitting another portion 12b of the light beam 12 along a first optical path of the interferometer 20 and another parallel portion 16b of the light beam 16 along a second optical path of the interferometer 20. This beam splitter 18 comprises a 50 percent reflecting mirror 22 formed on the front face of an optically flat glass plate 24 having parallel front and back faces and being oriented at an angle of about 45° with respect to a reference plane normally intersecting the substantially parallel light beams 12 and 16.

A photoelectric detector 26 having, for example, a square law detection characteristic is mounted in the optical path traversed by the parallel reflected portions 12a and 16a of the light beams 12 and 16 for mixing similarly polarized components of these reflected portions to produce an electrical reference signal having a frequency $f_R$ of 500 kilohertz, the difference in optical frequency between the light beams 12 and 16. These reflected portions 12a and 16a of the light beams 12 and 16 must follow substantially parallel paths in arriving at the photoelectric detector 26 and must overlap on an area of the photosensitive surface of the photoelectric detector 26 in order for the components having the same polarization to mix and produce the electrical reference signal.

A reflector 28 is mounted in the first interferometric optical path traversed by the transmitted portion 12b of the light beam 12 for reflecting this transmitted portion back along this first optical path to the beam splitter 18. This reflector 28 comprises a 100 percent reflecting mirror 30 that is formed on the front face of an optically flat glass plate 32 having parallel front and back faces and being oriented substantially normal to the transmitted portion 12b of the light beam 12. A retroreflector 34 is mounted in the second interferometric optical path traversed by the transmitted portion 16b of the light beam 16 for reflecting this transmitted portion to the back side of the reflector 28 from which it is reflected back along this second optical path to the beam splitter 18. This retroreflector 34 comprises, for example, a glass cube corner having three mutually perpendicular reflecting faces 36 and a transmitting face 38 so that an incident beam of light striking the transmitting face 38 is reflected parallel to its original path of incidence no matter what its original direction may be. The retroreflector 34 is mounted for translational movement, as generally indicated at 40, so that the optical length of the second optical path of the interferometer 20 may be changed.

The parallel light beam portions 12b and 16b that are reflected back along the first and second interferometric optical paths to the beam splitter 18 are partially reflected by the beam splitter 18 in the same parallel relationship. Another photoelectric detector 42 having, for example, a square law detection characteristic is mounted in the optical path traversed by these parallel light beam portions 12b and 16b for mixing similarly polarized components of these light beam portions to produce an electrical comparison signal having a frequency $f_C$ that equals the frequency $f_R$ 500 kilohertz) of the reference signal only so long as the retroreflector 34 is not being moved.

The output of the photoelectric detector 26 is connected to the count up input of a 1 megahertz reversible counter 44 for positively counting the frequency $f_R$ of the reference signal, and the output of the photoelectric detector 42 is connected to the countdown input of the reversible counter 44 for negatively counting the frequency $f_C$ of the comparison signal. In this manner the reversible counter 44 integrates in time, the difference in frequency $\pm \Delta f$ between these signals. Since $f = d\phi/dt = \beta dl/dt$ the integrated difference in frequency between the reference signal and the comparison signal while the retroreflector 34 is being moved is equal to the change in phase of the comparison signal relative to the reference signal and hence to the change in the optical length of the second interferometric optical path that produced this change in phase. Thus, although the frequency $f_C$ of the comparison signal becomes the same as the frequency $f_R$ of the reference signal after the retroreflector 34 has come to rest, the output 46 of the reversible counter 44 continuously indicates the change in phase of the second interferometric optical path relative to the first interferometric optical path and hence the change in the optical length of this second optical path in units of the wavelength of light. For example, if a one-quarter wavelength interferometer 20 is used, a change of one-quarter light wavelength in the optical length of the second interferometric optical path produces a unit change of one cycle (that is, of 1 hertz for 1 second) in the frequency $f_C$ of the comparison signal relative to the frequency $f_R$ of the reference signal while the retroreflector 34 is being moved. The direction of the change in the optical length of this second optical path is determined by whether the frequency $f_C$ of the comparison signal exceeds or is less than the frequency $f_R$ of the reference signal.

Since this interferometric system is an a-c system it is not subject to $1/f$ noise or d-c shifts. Moreover, such techniques as automatic gain control may be used in the electrical output portion of the system so as to compensate for temperature gradients, air turbulence, and other causes of instability that might otherwise seriously impair the stability and the reliability of the system.

Figure 2:
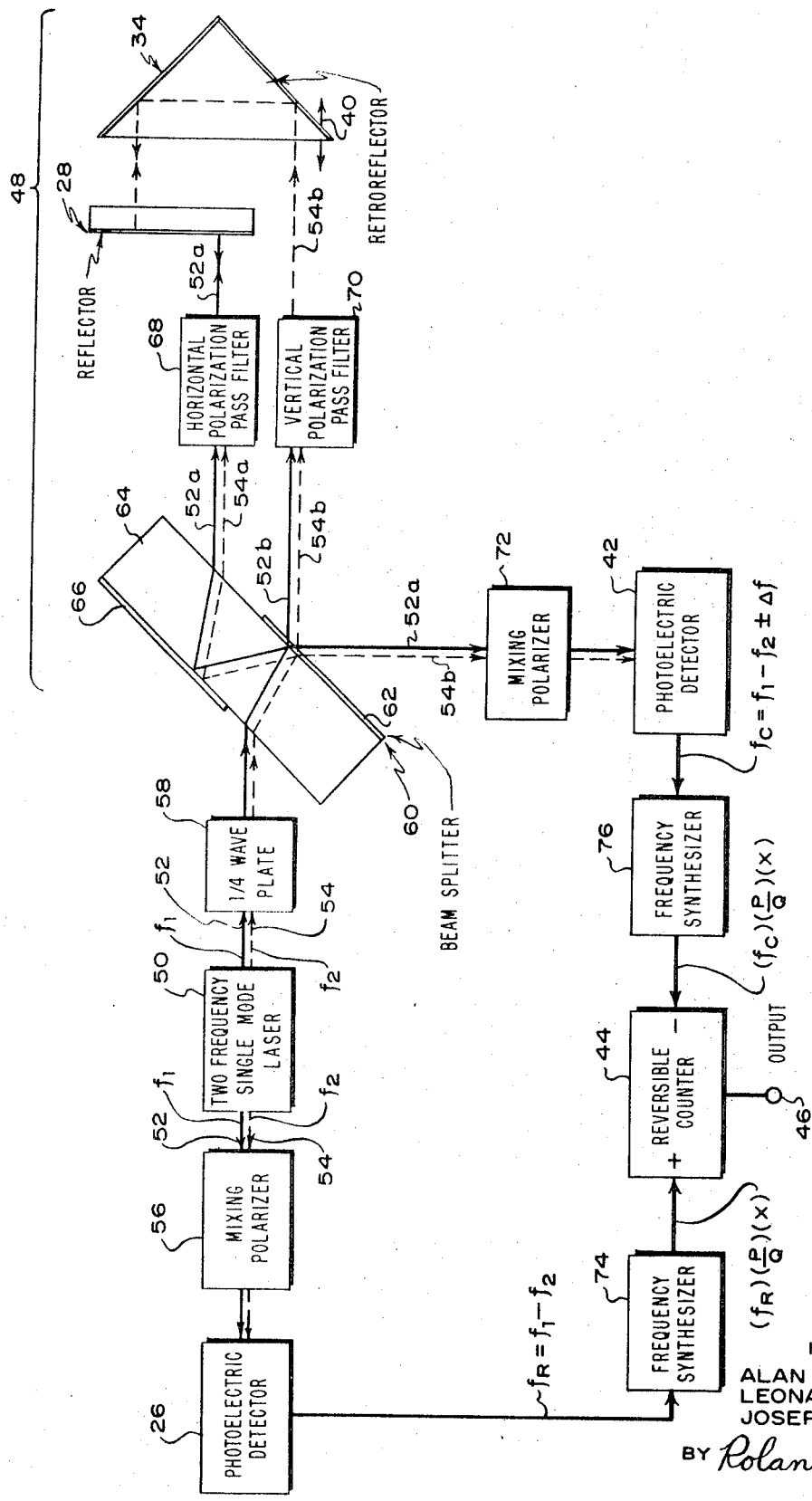
FIG. 2 is a schematic representation of another embodiment of this invention.

Referring now to FIG. 2, there is shown another interferometric system comprising a two frequency single mode laser 50 for producing a beam of light including a first component 52 having a frequency $f_1$ and a second component 54 having a frequency $f_2$ that differs from the frequency $f_1$ by a countable intermediate frequency, such as 500 kilohertz. This two frequency single mode laser 50 may comprise a plasma tube laser having spaced internal mirrors, which are mounted within the plasma tube opposite one another and perpendicular to the axis of the plasma tube so as to allow all polarizations to be amplified identically, and having a magnetic field superimposed along the plasma tube so as to produce right-hand and left-hand circularly polarized light components 52 and 54 of different frequency. Since the components 52 and 54 differ in polarization as well as in frequency they are considered separate parallel and overlapping light beams 52 and 54 for purposes of this specification and the claims appended hereto.

A mixing polarizer 56 is mounted in an optical path traversed by the parallel and overlapping light beams 53 and 54 for mixing these beams to provide each beam with a component of similar polarization. These similarly polarized components are mixed by a photoelectric detector 26 so as to produce an electrical reference signal having a frequency $f_R$ of 500 kilohertz, the difference in optical frequency between light beams 52 and 54.

A one-quarter wave plate 58 is mounted in another optical path traversed by the circularly polarized light beams 52 and 54 so as to change the right-hand circular polarization of the light beam 52 to linear horizontal polarization and the left-hand circular polarization of the light beam 54 to linear vertical polarization. A beam splitter 60 of an interferometer 48 is also mounted in this other optical path for reflecting a portion of each light beam 52 and 54 along a first optical path of the interferometer 48 and for transmitting another portion of each light beam 52 and 54 along a second optical path of the interferometer 48. This beam splitter 60 comprises a 50 percent reflecting mirror 62 that is formed in the path of the parallel and overlapping light beams 52 and 54 on the back face of an optically flat glass plate 64 having parallel front and back faces and being oriented at an angle of about 45° with respect to a reference plane normally intersecting these light beams 52 and 54.

A one hundred percent reflecting mirror 66 is formed on the front face of the glass plate 64 in the first interferometric optical path traversed by the reflected portion of each light beam 52 and 54 for reflecting these reflected portions 52a and 54a along a portion of this first interferometric optical path that is parallel to a first portion of the second interferometric optical path to a horizontal polarization pass filter 68 that is mounted in this portion of the first interferometric optical path. The horizontal polarization pass filter 68 absorbs the incident portion 54a of the light beam 54 of vertical polarization and passes the incident portion 52a of the light beam 52 of horizontal polarization. A reflector 28 is also mounted in the first interferometric optical path for reflecting the passed portion 52a of the light beam 52 of horizontal polarization back along the first optical path to the beam splitter 60.

A vertical polarization pass filter 70 is mounted in the first portion of the second interferometric optical path traversed by the transmitted portion of each light beam 52 and 54 for absorbing the incident portion 52b of the light beam 52 of horizontal polarization and for passing the incident portion 54b of the light beam 54 of vertical polarization to a retroreflector 34 that is also mounted in the second interferometric optical path. This retroreflector 34 is mounted for translational movement, as generally indicated at 40, so that the optical length of the second optical path of the interferometer 48 may be changed. The retroreflector 34 reflects the passed portion 54b of the light beam 54 of vertical polarization along a spaced and parallel second portion of the second interferometric optical path to the back side of the reflector 28 from which it is reflected back along the second interferometric optical path to the beam splitter 60.

The light beam portions 52a and 54b that are reflected back along the first and second interferometric optical paths to the beam splitter 60 are partially transmitted and reflected by the beam splitter 60 in parallel and overlapping relationship to a mixing polarizer 72. The mixing polarizer 72 mixes the parallel and overlapping light beam portions 52a and 54b to provide each of these light beam portions with a component of similar polarization. These similarly polarized components are mixed by a photoelectric detector 42 so as to produce an electrical comparison signal having a frequency $f_C$ that equals the frequency $f_R$ (500 kilohertz) of the reference signal only so long as the retroreflector 34 is not being moved.

As described in connection with FIG. 1, a 1 megahertz reversible counter 44 may be connected to the output of each of the photoelectric detectors 26 and 42 for positively counting the frequency $f_R$ of the reference signal and for negatively counting the frequency $f_C$ of the comparison signal while the retroreflector 34 is being moved so as to continuously indicate the change in phase of the second interferometric optical path relative to the first interferometric optical path and hence the change in optical length of this second optical path in units of light wavelength. The resolution of this interferometric system for measuring length may be substantially improved by connecting a frequency synthesizer 74 between the output of the photoelectric detector 26 and the count up input of the reversible counter 44 and by connecting another frequency synthesizer 76 between the output of the photoelectric detector 42 and the count down input of the reversible counter 44. These frequency synthesizers 74 and 76 multiply the frequencies of the reference and comparison signals by a rational fraction P/Q, where P is an integer and Q is a smaller integer. Thus, if a one-quarter wavelength interferometer 48 is used, a change of only Q/4P light wavelength in the optical length of the second interferometric optical path produces a unit change of one cycle (that is, of 1 hertz for 1 second) in the frequency $f_C$ of the comparison signal relative to the frequency $f_R$ of the reference signal while the retroreflector 34 is being moved. The frequency synthesizers 74 and 76 are also used to convert the wavelength unit of measured length to a conventional unit of measured length, such as the centimeter, by multiplying the frequencies $f_R$ and $f_C$ of the reference and comparison signals by the appropriate conversion factor X.

We claim:

1. An interferometric system comprising:

a laser for emitting a first light beam of a first circular polarization and a first optical frequency and for emitting a parallel and overlapping second light beam of a second circular polarization and a second optical frequency;

a quarter-wave plate optically coupled to said laser for converting the first circular polarization of the first light beam to a first linear polarization and for converting the second circular polarization of the second light beam to a second linear polarization;

an interferometer having first and second optical paths with the optical length of said second optical path being variable relative to the optical length of said first optical path;

said interferometer including a beam splitter optically coupled to said quarter-wave plate for reflecting a first portion of each of the first and second light beams along said first optical path and for transmitting a second portion of each of the first and second light beams along said second optical path;

a first polarization filter mounted in said first optical path for passing substantially only the first portion of the first light beam along said first optical path;

a second polarization filter mounted in said second optical path for passing substantially only the second portion of the second light beam along said second optical path;

said interferometer including first reflecting means mounted in said first optical path for reflecting the first portion of the first light beam along said first optical path back to a recombination region of said beam splitter;

said interferometer including second reflecting means mounted in said second optical path for reflecting the second portion of the second light beam along said second optical path back to the recombination region of said beam splitter;

a mixing polarizer optically coupled to the recombination region of said beam splitter for providing the first portion of the first light beam and the second portion of the second light beam with components of similar polarization;

a photoelectric detector optically coupled to said mixing polarizer for combining the first portion of the first light beam and the second portion of the second light beam to produce an electrical information signal having a frequency equal to the difference in optical frequency between the first portion of the first light beam after it has traversed said first optical path and the second portion of the second light beam after it has traversed said second optical path;

a frequency synthesizer electrically coupled to said photoelectric detector for multiplying the frequency of the electrical information signal by a selected factor; and output means electrically coupled to said frequency synthesizer and responsive to a change in the frequency of the electrical information signal while the optical length of said second optical path is being varied relative to the optical length of said first optical path for providing an indication related to the change in the optical length of said second optical path relative to the optical length of said first optical path.

* * * * *

UNITED STATES PATENT OFFICE
CERTIFICATE OF CORRECTION

Patent No. 3,656,853          Dated  April 18, 1972

Inventor(s) Alan S. Bagley, Leonard S. Cutler and Joseph F. Rando

It is certified that error appears in the above-identified patent and that said Letters Patent are hereby corrected as shown below:

Column 2, line 64, before "500" insert -- ( --;

Column 3, line 51, "53" should read -- 52 --.

Signed and sealed this 15th day of August 1972.

(SEAL)
Attest:

EDWARD M. FLETCHER, JR.          ROBERT GOTTSCHALK
Attesting Officer                Commissioner of Patents